(12) United States Patent
Phelps

(10) Patent No.: US 10,670,160 B2
(45) Date of Patent: Jun. 2, 2020

(54) ELECTRICALLY ACTUATED SAFETY VALVE AND METHOD

(71) Applicant: Nicholas Brandon Phelps, Broken Arrow, OK (US)

(72) Inventor: Nicholas Brandon Phelps, Broken Arrow, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 413 days.

(21) Appl. No.: 14/790,122

(22) Filed: Jul. 2, 2015

(65) Prior Publication Data

US 2017/0002945 A1     Jan. 5, 2017

(51) Int. Cl.

| F16K 17/36 | (2006.01) |
|---|---|
| F16K 31/06 | (2006.01) |
| F16K 31/04 | (2006.01) |
| E21B 34/06 | (2006.01) |
| F16K 31/50 | (2006.01) |
| F16K 1/20 | (2006.01) |
| E21B 34/00 | (2006.01) |

(52) U.S. Cl.
CPC .......... F16K 17/36 (2013.01); E21B 34/066 (2013.01); F16K 1/2007 (2013.01); F16K 31/047 (2013.01); F16K 31/0655 (2013.01); F16K 31/502 (2013.01); E21B 2034/005 (2013.01)

(58) Field of Classification Search
CPC ........................ E21B 2034/005; E21B 34/066
USPC ........................ 251/129.09, 129.15, 129.19
See application file for complete search history.

(56) References Cited

U.S. PATENT DOCUMENTS

| 2,202,192 | A | * | 5/1940 | Cypher | .................. | E21B 33/03 |
|---|---|---|---|---|---|---|
| | | | | | | 166/70 |
| 4,002,202 | A | | 1/1977 | Huebsch et al. | | |
| 4,119,146 | A | * | 10/1978 | Taylor | .................. | E21B 34/107 |
| | | | | | | 137/111 |
| 4,191,248 | A | | 3/1980 | Huebsch et al. | | |
| 4,407,329 | A | | 10/1983 | Huebsch et al. | | |
| 4,434,847 | A | * | 3/1984 | Vazquez | ............... | E21B 34/107 |
| | | | | | | 166/117.5 |
| 4,566,534 | A | | 1/1986 | Going | | |
| 4,579,177 | A | | 4/1986 | Going | | |
| 4,736,791 | A | | 4/1988 | Rorden et al. | | |
| 4,796,708 | A | | 1/1989 | Lembcke | | |
| 4,825,946 | A | * | 5/1989 | Schnatzmeyer | ...... | E21B 17/003 |
| | | | | | | 166/117.5 |
| 5,070,944 | A | * | 12/1991 | Hopper | ................. | E21B 34/066 |
| | | | | | | 166/66.7 |

(Continued)

FOREIGN PATENT DOCUMENTS

GB     2048336 A     12/1980

OTHER PUBLICATIONS

Notification of Transmittal of the International Search Report and the Written Opinion of the International Searching Authority, or the Declaration; PCT/US2016/035459; dated Sep. 27, 2016; 12 pages.

*Primary Examiner* — Angelisa L. Hicks
(74) *Attorney, Agent, or Firm* — Cantor Colburn LLP

(57) ABSTRACT

An electrically actuated safety valve includes a flapper. A flow tube in operable communication with the flapper; an electric actuation system including an electric holding configuration connecting a prime mover to the flow tube. A method for operating a safety valve.

18 Claims, 4 Drawing Sheets

(56) References Cited

U.S. PATENT DOCUMENTS

| | | | |
|---|---|---|---|
| 5,187,993 A * | 2/1993 | Nicholson | F16H 25/20 |
| | | | 185/40 R |
| 5,358,035 A * | 10/1994 | Grudzinski | E21B 34/066 |
| | | | 166/317 |
| 6,138,754 A * | 10/2000 | Veneruso | E21B 34/066 |
| | | | 166/250.03 |
| 6,199,629 B1 | 3/2001 | Shirk et al. | |
| 6,241,015 B1 * | 6/2001 | Pringle | E21B 34/066 |
| | | | 137/624.18 |
| 6,253,843 B1 | 7/2001 | Rawson et al. | |
| 6,269,874 B1 | 8/2001 | Rawson et al. | |
| 6,619,388 B2 | 9/2003 | Dietz et al. | |
| 6,899,171 B2 | 5/2005 | Biester et al. | |
| 8,464,799 B2 * | 6/2013 | Scott | E21B 34/066 |
| | | | 166/332.1 |
| 2002/0108747 A1 | 8/2002 | Dietz et al. | |
| 2004/0173362 A1 | 9/2004 | Waithman et al. | |
| 2008/0091103 A1 * | 4/2008 | Sundar | A61B 8/0841 |
| | | | 600/439 |
| 2014/0000870 A1 | 1/2014 | Vick, Jr. et al. | |

* cited by examiner

ELECTRICALLY ACTUATED SAFETY VALVE AND METHOD

BACKGROUND

In the drilling and completion industry, safety valves are commonly used. One of the inviolate concerns for safety valves is that they fail closed. More specifically, any failure of the safety valve system should result in the valve closing or staying closed. Another result would be undesirable and flow would not be as easily controlled and might result in excessive increase in costs for the operation.

Safety valves that are most ubiquitous employ hydraulic actuation systems. These work well for their intended purposes but suffer from the foot print needed on a rig to support the required hydraulic fluid and pumps needed to effectively and legally employ hydraulically actuated devices related to the borehole. Pressurizing the fluid requires equipment that must be housed but even more impactful on space is the hydraulic fluid that must be stored due to local regulations in many places. More particularly, many local regulations require three times the volume of hydraulic fluid expected to be used in order to remain in compliance with the law.

The art would be receptive to any systems that avoid the need for hydraulic actuation.

BRIEF DESCRIPTION

An electrically actuated safety valve includes a flapper; a flow tube in operable communication with the flapper; an electric actuation system including an electric holding configuration connecting a prime mover to the flow tube.

A method for operating a safety valve includes powering an electric holding configuration; rotating an electric motor and linear actuator operably attached to the electric holding configuration; translating the electric holding configuration; translating a piston ring with the electric holding configuration; to open or close a flapper of the safety valve.

An electric actuation system includes an electric motor; a linear actuator attached to the motor; an electric holding configuration translatable with the actuator; an interface member releasably engaged with the electric holding configuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
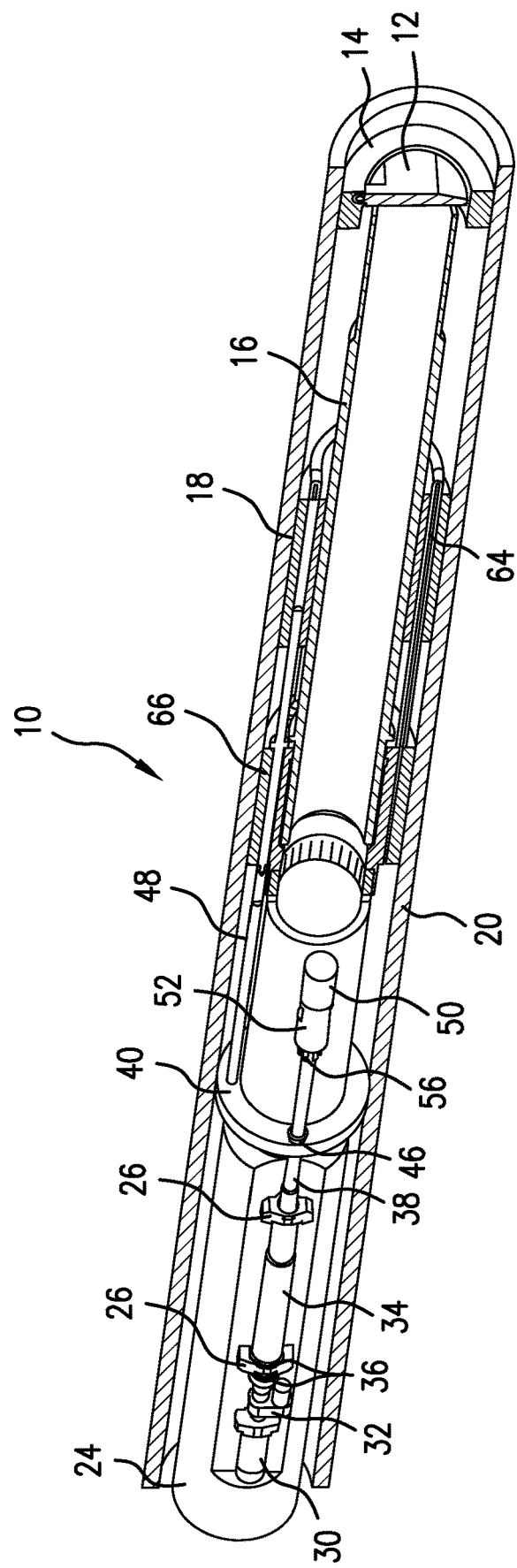
FIG. 1 is a schematic perspective illustration of a safety valve having an electric actuation system shown in a hold configuration disengaged valve closed position.
Figure 2:
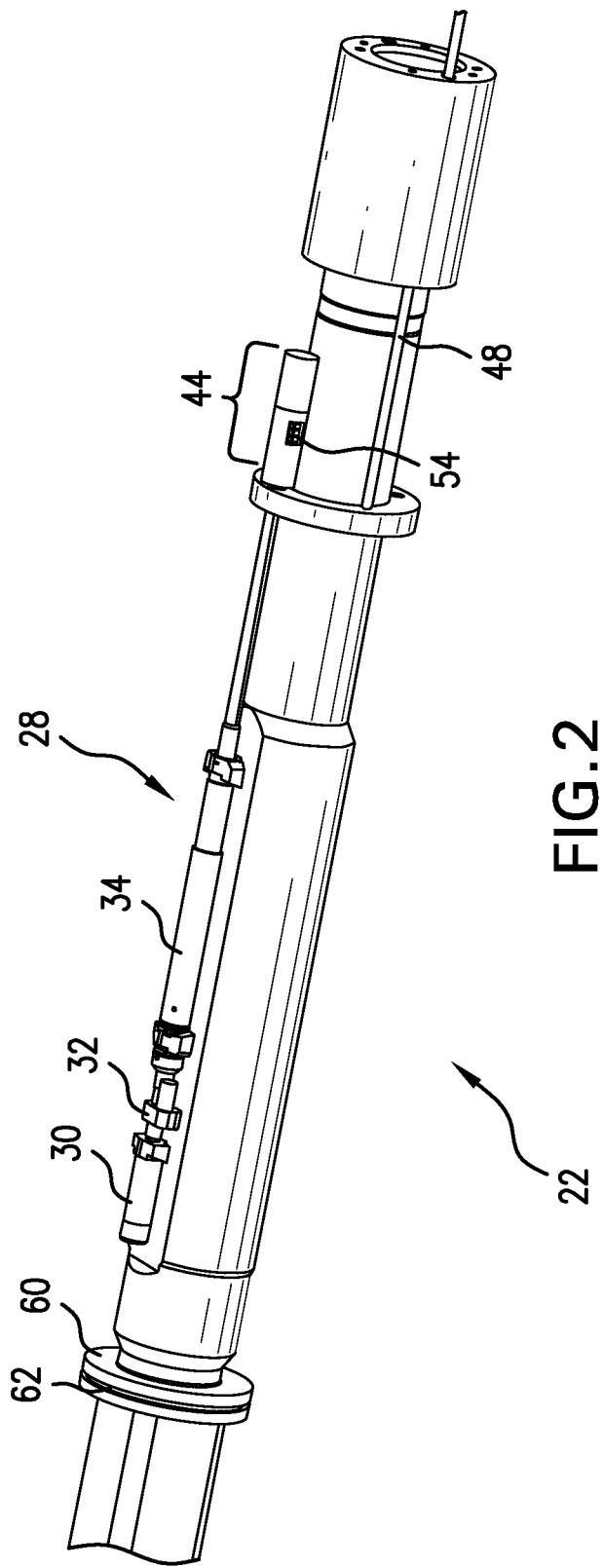
FIG. 2 is a view similar to FIG. 1 but focused upon the actuation system.

Referring to FIGS. 1, and 2, an electrically actuated safety valve 10 is illustrated in a position where all of the components can be seen. Familiar to the reader will be the flapper 12, flapper housing 14, flow tube 16, cylinder plate 18 and spring housing 20. Notably the power spring is not shown but is well known to those of ordinary skill in the art with respect to position, constitution and function and therefore is omitted to reduce complexity of the drawings. The noted components are common to prior art safety valves and hence require no specific discussion.

Also illustrated in FIGS. 1 and 2 is an electric actuation system 22. The system 22 includes a mandrel 24. Mandrel 24 provides one or more brackets 26. Interactive with the one or more brackets 26 is a prime mover 28 that comprises a number of components. Providing motive force for the prime mover 28 is a motor 30 that is electrically driven. The motor 30 is attached in one embodiment to a gearbox 32. The gearbox 32 provides a multiplication of torque for the motor 30 so that the motor may be of small size and still have the requisite power to drive other components of the prime mover 28. Attached to the gearbox 32 is a mechanical linear actuator follower 34 such as a leadscrew nut or a ball nut, for example. The follower 34 is torque transmissively attached to the gearbox 32 so that as an output (not shown) from gearbox 32 rotates, the follower 34 will also rotate. Follower 34 is supported by the one or more brackets 26 that may or may not include thrust bearings 36, bushings, etc. (or other mechanical equivalent). Not visible but as will be understood by one of ordinary skill in the art by the description of a linear actuator, the follower 34 will include a screw or ball thread on an inside diameter thereof to interact with an outside diameter screw or ball thread on a linear actuator shaft 38. These interactive surfaces cooperate to cause the shaft 38 to extend or retract based upon the direction of rotation of the follower 34. The shaft 38 is to be threaded for the length of the shaft that needs to be interactive with the follower 34. Beyond that length, some embodiments will be configured to resist rotation of the shaft 38 such as by incorporating flats.

The shaft extends through an interface member such as a piston ring 40 and into engagement with an electric holding configuration 44. The holding configuration employs an electric current to generate a hold between the shaft and other components of the system 22. In one embodiment, the holding configuration 44 is a solenoid assembly. The solenoid assembly 44 stays with the shaft 38 and translates along with the shaft based upon the rotational movement of the follower 34. In the illustrated embodiment, the piston ring 40 further includes a solenoid attachment feature 46 discussed below and is configured to urge a flow tube rod 48 and thence the flow tube 16 toward a flapper 12 during an opening operation.

The bracket 26 and/or the piston ring 40 may be provisioned to allow the shaft 38 to slide relative thereto but not to rotate relative thereto. This can be accomplished by configuring the shaft with one or more flats (complementary to flats in the bracket or in the piston ring) over the length of the shaft that will be interactive with the bracket or the piston ring 40 during operation of the safety valve 10.

The feature 46 is illustrated as a nipple type protrusion from the piston ring 40. It is to be understood however that other configurations may be substituted for the one illustrated including features that penetrate into the piston ring 40 instead of protrude therefrom. In all cases, the feature 46 has for its purpose to allow releasable affixation to the solenoid assembly 44. As noted above, the solenoid assembly translates with the shaft 38 and so if the solenoid assembly is attached to the piston ring 40 (via feature 46), the piston ring 40 will also translate thereby causing the flow tube rod 48 to actuate the flapper 12 in the conventional way.

Focusing upon the solenoid assembly 44, presented is a solenoid 50 attached to a collet sleeve 52. The sleeve 52 houses a spring 54 and a collet 56. The collet 56 is axially translatable by the solenoid 50. The spring 54 is positioned to maintain the collet 56 in a position where it is extended from the collet sleeve 52 so that in the event of electrical failure, the collet will protrude from the collet sleeve and release the feature 46 thereby allowing the piston ring 40, flow tube rod 48 and the connected flow tube and flapper to move to a closed condition pursuant to normal operation of a power spring (not shown). This is a failsafe tool which is of great benefit to the art and a breakthrough for an electrically actuated safety valve.

Referring to FIGS. 1 and 2, it is well to note that the system 22 is maintained in a hydraulically balanced chamber. The chamber is pressure tight and in one embodiment is bounded at one end by wall 60 and a seal such as but not limited to an oring (not shown) in seal groove 62, which seals against spring housing 20. Other embodiments contemplated include any configurations that allow for pressure to be contained in the chamber. At the other end, the chamber is bounded by cylinder sub 66. Seals such as orings (not shown) seal between the cylinder sub 66 and the spring housing 20. Further attention is directed to pressure tube 64 that shunts fluid in the chamber displaced by movement of the flow tube rod 48 back to the chamber to have a net 0 change in hydraulic fluid volume. This also ensures that pressure across the flow tube rod 48 is always balanced, which is instrumental in avoiding valve complications due to leaks in the chamber. This also results in the chamber in which the electric actuation system is housed being volume balanced.

Figure 3:
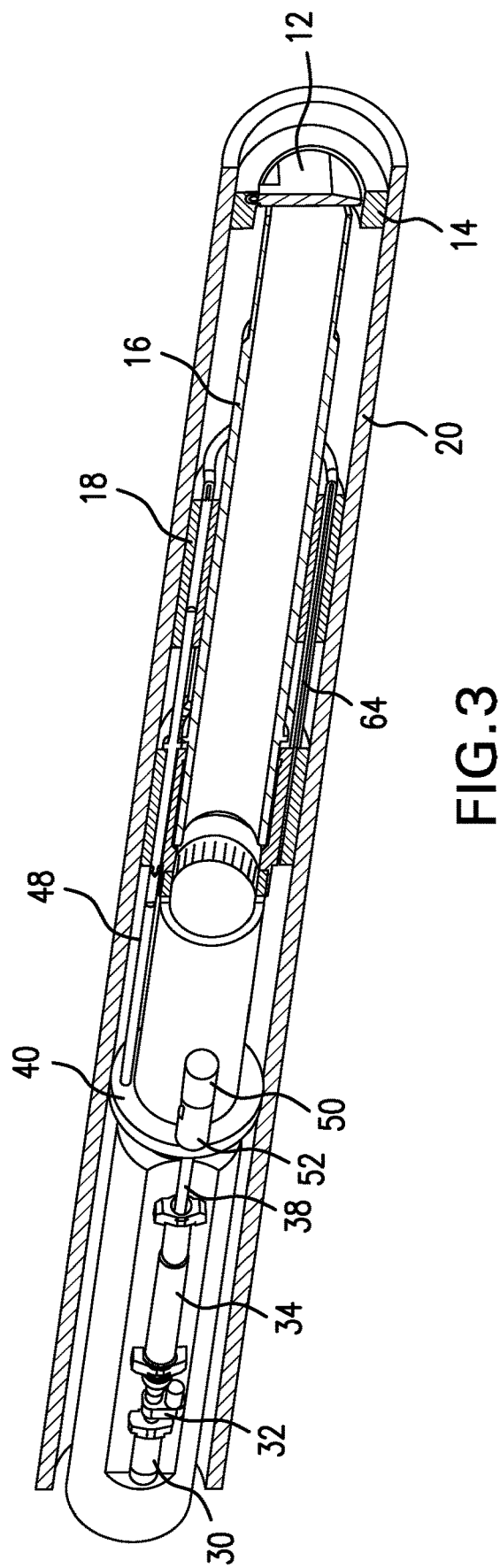
FIG. 3 is the system shown in FIG. 1 in a hold configuration engaged, valve closed position.
Figure 4:
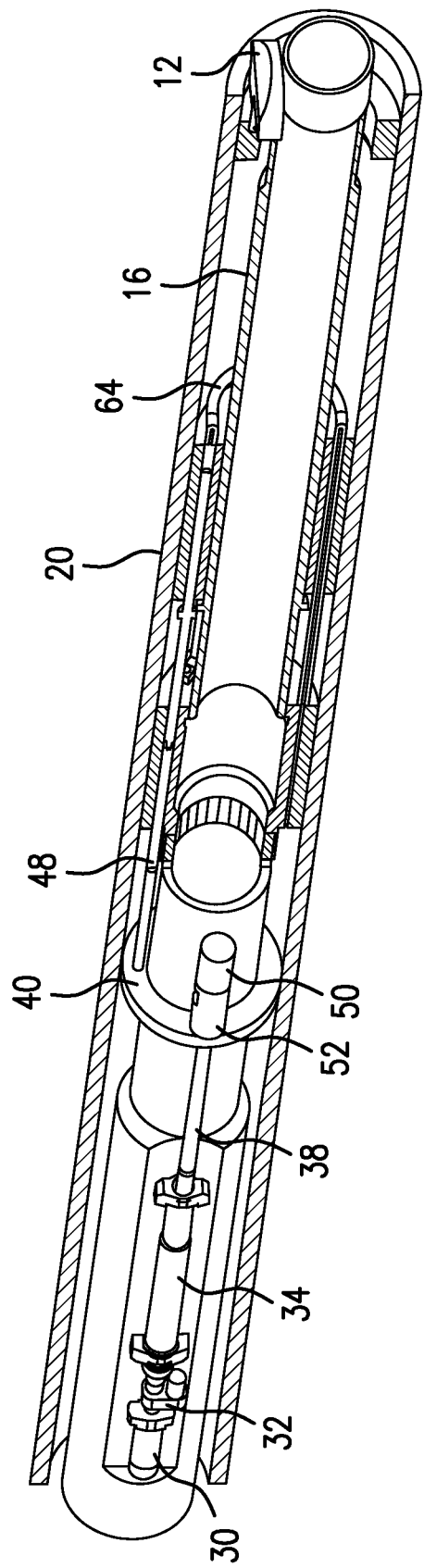
FIG. 4 is the system shown in FIG. 1 in a hold configuration engaged, valve open position.

With the components described above and shown in FIGS. 1 and 2, reference is made to FIGS. 3 and 4 for context of operation. FIGS. 3 and 4 both show the solenoid assembly attached to the piston ring. FIG. 3 is in a valve closed position and FIG. 4 is in a valve open position. FIG. 1, in addition to providing visualization for all of the components of the valve and actuation system, is also illustrative of a power failure condition resulting in the solenoid assembly 44 releases the piston ring 40 and hence allows the valve to close as per conventional components (i.e. the power spring).

Electrical current is supplied to both the motor 30 and the solenoid 50 during normal operation of the safety valve. Current for the solenoid 50 is required to maintain the connection of the collet 56 with the feature 46 enabling opening of the safety valve and without which there would be no purpose in rotating the motor 30.

During normal operation of the safety valve 10, current already being supplied to the solenoid assembly 44 (since such is required for the balance of the valve to be operable to any other position but closed), a command to open the valve 10 results in current being supplied to the motor 30 causing the motor 30 to rotate. Torque produced by the motor is multiplied within the gearbox 32 and transmitted by direct connection to the follower 34. With the follower rotating, the linear actuator shaft 38 is translated to a position toward the flapper 12. This moves the solenoid assembly toward the flapper 12 as a function of the shaft 38 moving in that direction. Because the solenoid has been energized, the collet 56 is engaged with the feature 46 and withdrawn into collet sleeve 52 by virtue of the solenoid 50 pulling the collet 56 into the sleeve 52 against the force of spring 54. Due to the engagement of solenoid assembly 44 with the piston ring 40, when the solenoid assembly moves so too does the piston ring. This causes, consequently, the movement of flow tube rod 48 to urge the flow tube 16 against its power spring (not shown but well known) to push open the flapper 12.

The flapper 12 may be maintained in this position or be selectively closed by either maintaining the motor in the position or by rotating the motor in the other direction, respectively. Alternatively, if the current is lost for any reason the solenoid 50 will release the collet 56 which will then be extended from collet sleeve 52 by the spring 54 causing the collet to disengage the feature 46 and the power spring (not shown) will close the safety valve according to normal operation of a safety valve.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:
1. An electrically actuated safety valve comprising:
a flapper;
a flow tube in operable communication with the flapper;
an electric actuation system including a rotationally fixed and axially translatable shaft and an electric holding configuration mounted to and translatable with the shaft, the electric holding configuration selectively connecting a prime mover to the flow tube.

2. The safety valve as claimed in claim 1 wherein the electric holding configuration is a solenoid assembly.

3. The safety valve as claimed in claim 2 wherein the solenoid assembly comprises a collet and a collet sleeve.

4. The safety valve as claimed in claim 2 wherein the solenoid assembly includes a spring.

5. The safety valve as claimed in claim 1 further including a flow tube rod that is pressure balanced.

6. The safety valve as claimed in claim 1 wherein the electric actuation system comprises:
a motor;
a follower operatively attached to the motor;
the shaft translatable in the follower.

7. The safety valve as claimed in claim 6 further including a piston ring, the ring including a feature configured to interact with the electric holding configuration.

8. The safety valve as claimed in claim 7 wherein the feature is a nipple.

9. The safety valve as claimed in claim 1 wherein a chamber in which the electric actuation system is housed is volume balanced.

10. The method as claimed in claim 9 further including automatically releasing the piston ring from the electric holding configuration upon interruption of power to the electric holding configuration, resulting in automatic closure of the safety valve.

11. A method for operating a safety valve comprising:
powering an electric holding configuration;
rotating an electric motor and linear actuator operably attached to the electric holding configuration;
translating the electric holding configuration with a rotationally fixed and axially translatable shaft;
translating a piston ring with the electric holding configuration; to open or close a flapper of the safety valve.

12. An electric actuation system comprising:
an electric motor;
a rotationally fixed and axially translatable linear actuator attached to the motor;
an electric holding configuration translatable with the actuator;
an interface member releasably engaged with the electric holding configuration.

13. The electric actuation system as claimed in claim 12 wherein the electric holding configuration comprises a solenoid assembly.

14. The electric actuation system as claimed in claim 13 wherein the solenoid assembly comprises:
a solenoid;
a collet sleeve attached to the solenoid;
a collet translatable to a position within the collet sleeve and a position in which the collet is extended from the collet sleeve; and
a spring configured to urge the collet to the position in which the collet is extended from the collet sleeve.

15. The electric actuation system as claimed in claim 14 wherein the position in which the collet is extended from the collet sleeve renders the collet incapable of holding another member of the system such that the member is released upon the collet obtaining this position.

16. The electric actuation system as claimed in claim 12 wherein the linear actuator is a leadscrew and nut.

17. The electric actuation system as claimed in claim 12 wherein the linear actuator is a ball screw and ball nut.

18. The electric actuation system as claimed in claim 12 wherein the linear actuator extends through the interface member, the interface member being a piston ring configured to transfer movement to other components of a safety valve to open the same.

* * * * *